(12) United States Patent
Griffin et al.

(10) Patent No.: US 12,155,528 B2
(45) Date of Patent: Nov. 26, 2024

(54) MESH NETWORK UPDATE MANAGEMENT

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/670,345

(22) Filed: Feb. 11, 2022

(65) Prior Publication Data

US 2023/0261938 A1    Aug. 17, 2023

(51) Int. Cl.
*H04L 41/0813*    (2022.01)
*G06F 8/65*    (2018.01)
*H04L 41/0866*    (2022.01)

(52) U.S. Cl.
CPC ......... *H04L 41/0813* (2013.01); *G06F 8/65* (2013.01); *H04L 41/0866* (2013.01)

(58) Field of Classification Search
CPC .... H04L 41/0813; H04L 41/0866; G06F 8/65
See application file for complete search history.

(56) References Cited

U.S. PATENT DOCUMENTS

| | | | |
|---|---|---|---|
| 8,793,680 B2 | 7/2014 | Jeong | |
| 8,910,141 B2 | 12/2014 | Bahls et al. | |
| 9,081,643 B2 | 7/2015 | Wang et al. | |
| 9,489,193 B2 | 11/2016 | Reynolds | |
| 9,614,799 B2 | 4/2017 | Veillette | |
| 9,754,096 B2 | 9/2017 | Scagnol et al. | |
| 2011/0082939 A1* | 4/2011 | Montemurro | H04W 76/14 709/227 |
| 2013/0326606 A1* | 12/2013 | Kelly | H04L 9/3228 709/224 |
| 2014/0089912 A1* | 3/2014 | Wang | G06F 8/65 717/173 |
| 2016/0132578 A1* | 5/2016 | Allen | H04L 67/55 709/203 |
| 2018/0115435 A1* | 4/2018 | George | H05B 45/10 |
| 2018/0239347 A1* | 8/2018 | Downor | G05B 19/4063 |
| 2018/0275982 A1* | 9/2018 | Hunt | H04W 4/70 |
| 2019/0036781 A1* | 1/2019 | Prabhu | G06F 8/65 |
| 2021/0227404 A1* | 7/2021 | Lydecker | G06F 8/658 |
| 2022/0129258 A1* | 4/2022 | Ladkani | G06F 8/65 |

FOREIGN PATENT DOCUMENTS

KR    102267420 B1    6/2021
WO    2015167321 A1    11/2015

* cited by examiner

*Primary Examiner* — Brian J. Gillis
*Assistant Examiner* — Juan C Turriate Gastulo
(74) *Attorney, Agent, or Firm* — Womble Bond Dickinson (US) LLP

(57) ABSTRACT

A method of managing updates in a mesh network includes determining that an update is available for a first computing node of a mesh network and identifying one or more characteristics of the first computing node of the mesh network. The method further includes determining an update strategy for providing the update to the first computing node in view of the one or more characteristics of the first computing node and providing the update to the first computing node in view of the update strategy.

17 Claims, 6 Drawing Sheets

MESH NETWORK UPDATE MANAGEMENT

TECHNICAL FIELD

Aspects of the present disclosure relate to networked devices, and more particularly, to mesh network update management.

BACKGROUND

A mesh network is a network topology that includes nodes (i.e. bridges, switches, internet-of-things (IoT) devices, and other infrastructure devices) that are interconnected directly and non-hierarchically to other nodes and interact to communicate within the mesh. The interconnected format of the nodes allows for multiple nodes to participate in the relay of information.

Mesh networks may be formed from multiple types of devices, including nanotechnology, or nanotech, devices. Nanotech is an emerging technology that includes devices on a miniature scale, including atomic, molecular, and supramolecular scale. For example, nanotech devices may have dimensions less than 100 nanometers (nm). The reduced size of such devices allows for a wide range of potential applications, including biological applications. Large numbers of nanotech devices may be organized in a mesh network.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
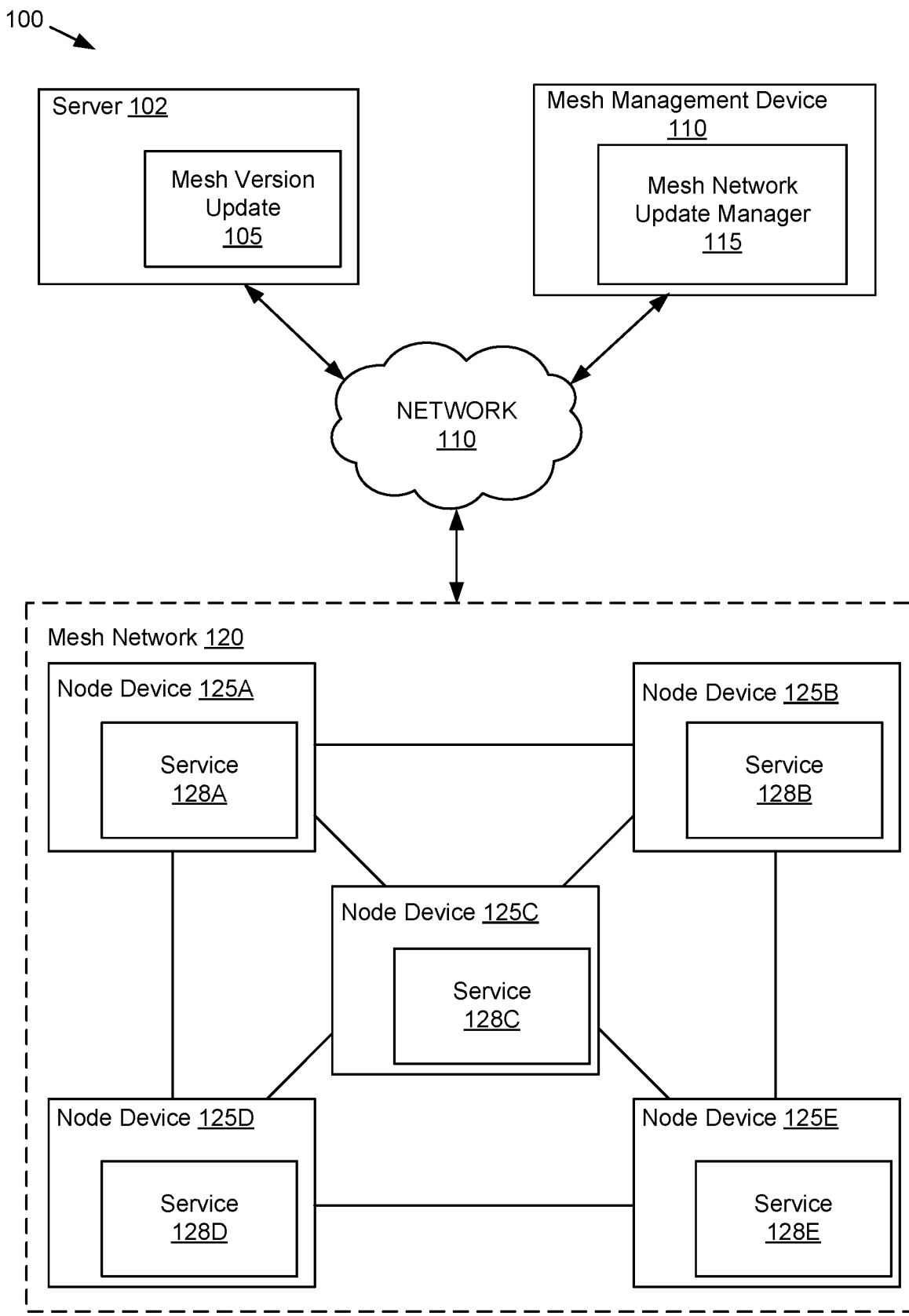
FIG. 1 is a block diagram that illustrates an example of a network architecture for mesh network update management, in accordance with one or more aspects of the present disclosure.

Internet-of-things (IoT) devices have become increasingly ubiquitous and, as a result, various solutions have been proposed to communicate with and between large networks of IoT devices. IoT devices can have various types of software and/or hardware configurations and capabilities. By networking the IoT devices together, functionalities performed by one of the IoT devices may be provided as a service to other IoT devices that lack that functionality. For example, some IoT devices may have a particular type of processing functionality (such as authentication or password management) that may be provided to other IoT devices in the network.

Ensuring that firmware and software patches of a mesh network are up to date is a critical process in a mesh network to protect the network against vulnerabilities. In conventional mesh networks, the entire network may be treated as a single device or entity with respect to security and access. Therefore, a single compromised device can result in the entire network being compromised. Conventional mesh networks, however, do not provide for granular management of updates to the entire mesh to ensure that each node of the mesh includes the most up to date software.

Aspects of the disclosure address the above-noted and other deficiencies by providing mesh network update management. A mesh network update manager may include a rule engine to configure which updates are to be performed, to which nodes the updates are provided, and the manner in providing the updates. The mesh network update manager may obtain a metrics view of the entire mesh network including all nodes included in the network and the relevant firmware and/or software versions (e.g., version numbers) of each node. The mesh network update manager may also link to any available software updates (e.g., an external update server) to identify if the nodes of the mesh network have the latest available software and/or firmware.

Once the mesh network update manager determines that a newer software version is available for one or more nodes of the mesh, the mesh network update manager determines which nodes the update is to be pushed to, attempts to provide the update to each of the identified nodes, and tracks whether the nodes have successfully received the update. For example, the mesh network update manager may notify the nodes that the update is available and provide a link to the update from which the nodes can retrieve (e.g., download) the update. However, in some instances, the nodes may fail to retrieve the update in which case the mesh network update manager may attempt a force push of the update directly to the node. In some examples, some nodes may not have network access (e.g., WiFi™, Ethernet, etc.) and therefore the mesh network update manager may push instructions to a neighboring node that has already received the update to provide the update to the node via peer to peer communications (e.g., infrared (IR), radio frequency identifier (RFID), or any other peer to peer protocol). The node that is targeted for an update may referred to herein as a target node. The neighbor node may then report an acknowledgement that the update was successfully received by the target node. In some examples, however, the target node may be unavailable (e.g., if the node has failed or is compromised). If all attempts to provide the update to the target node have failed, the mesh network update manager may determine that the target node is unavailable and remove it from the mesh network. Each node in the mesh network may be instructed to remove that target node from its routing lists and neighbor lists to avoid any further communications with that target node. Therefore, the failure of that target node to obtain the update does not compromise the integrity of the entire mesh network.

As compared to conventional devices, embodiments of the present disclosure provide for increased mesh network stability and security. Embodiments further provide provable updates and means to perform intelligent decisions to ensure mesh level updates are in place throughout the mesh.

FIG. 1 depicts a system diagram of an illustrative example of a network architecture 100, in accordance with one or more aspects of the present disclosure. Although the discussion with respect to FIG. 1 describes a mesh network, other network architectures (e.g., non-mesh) are possible without deviating from the scope of the present disclosure, and the implementation of a computer system utilizing examples of the disclosure are not necessarily limited to the specific architecture depicted by FIG. 1.

As depicted in FIG. 1, network architecture 100 includes a download server 102 and a mesh management device 100 coupled to a mesh network 120 via a network 110. The download server 102 includes a download service 105 for providing a download payload that is to be distributed to nodes of the mesh network. The mesh management device 110 includes a download optimization service 115. The mesh network 120 includes a plurality of node devices 125A-E. Although depicted as separate, the download server 102 and the download optimization service 115 may also be implemented as a node of the mesh network 120. Furthermore, although five node devices are depicted in FIG. 1, any number of node devices may be included in the mesh network 120. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the configuration device 140 and one or more of the node devices 125A-E.

The server 102, the mesh management device 110, and each node device 125A-E may include a processing device, memory, storage, networking hardware, and any other computing hardware. The processing device may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also include one or more special-purpose processing devices such as an application specific integrated circuit (ASIC), a field programmable gate array (FPGA), a digital signal processor (DSP), network processor, or the like. The memory may include volatile memory devices (e.g., random access memory (RAM)), non-volatile memory devices (e.g., flash memory) and/or other types of memory devices. Furthermore, each of the computing devices may be a server, a mainframe, a workstation, a personal computer (PC), a mobile phone, a palm-sized computing device, a virtual instance of a computing device, etc. In some examples, each of the node devices 125A-E may be an IoT device or nanotech device.

Networking hardware of the computing devices (e.g., node devices 125A-E, download server 102, mesh management device 110) may include a networking interface through which a computing device can communicate with one or more other network connected devices. In some embodiments, a network interface may include a wireless technology, such as WIFI, Bluetooth, Home radio frequency (Home RF), radio frequency identifier (RFID), for example.

In some examples, the node devices 125A-E of the mesh network may communicate via peer to peer network techniques.

The node devices 125A-E may perform one or more services within the mesh network 120. For example, each node device 125A-E may execute a corresponding service 128A-E within the mesh network 120. As used herein, a "service" provided by the node device refers to a task or other technical activity performed by the node device 125A-E on behalf of or for another node device. The services 128A-E may include computer program logic utilized to provide the specified task or technical activity. Thus, a service can be implemented in hardware, firmware, and/or software. In one embodiment, services are stored on a non-transitory storage device (i.e., a computer program product), loaded into a memory, and executed by one or more processing devices. In some embodiments, the service may be provided by execution of computer instruction code on processing device. Examples of services include, but are not limited to, an authentication service, a storage service, a gateway service, a processing service, a power management service, and/or a packaging service.

In some examples, the mesh network update manager 115 of the mesh management device 110 may retrieve, or otherwise obtain, information about each of the nodes devices 125A-E of the mesh network 120. The information may include computing capabilities and networking capabilities of each node device 125A-E. In some examples, the information may include software and/or firmware versions included on each of the node devices 125A-E. The mesh network update manager may also determine geographic locations of each node device 125A-E with respect to the other node devices of the mesh network 120. In some examples, the mesh network update manager 115 may obtain the node device information directly from the devices that have network access capabilities. However, some node devices may not have network access. For such devices without network access, the mesh network update manager 115 may obtain the information through a peer node. For example, if node device 125A can connect to network 110 but node device 125B cannot connect to the network 110, the mesh network update manager 115 may instruct node device 125A to retrieve device information from node device 125B and forward the information to the mesh network update manager 115.

In some examples, the mesh network update manager 115 may determine if an update is available for any of the node devices 125A-E in the mesh network. For example, the mesh network update manager 115 may compare the software versions of the node devices 125A-E to the mesh version update 105 on the server 102 to determine if the node devices 125A-E have the latest version of the software. The mesh network update manager 115 may then provide the mesh version update 105 to the node devices 125A-E and track which node devices 125A-E have successfully received the mesh version update 105. If all attempts to provide the update to a node device fail, then the mesh network update manager 115 may remove the node from the mesh and replace the node's functionality with a different node device.

Figure 2:
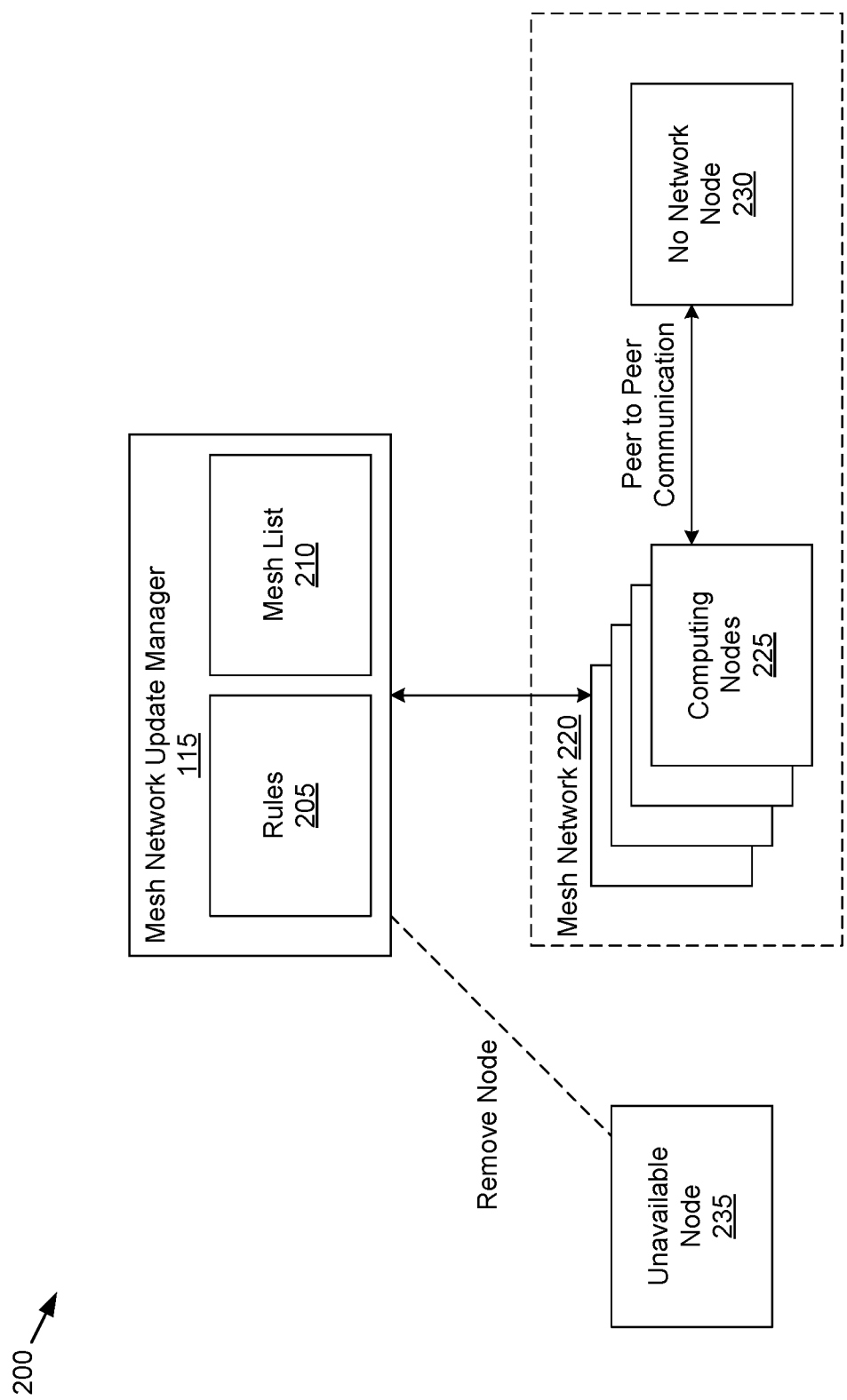
FIG. 2 is a system diagram illustrating an example mesh network update manager, in accordance with one or more aspects of the present disclosure.

FIG. 2 is a system diagram illustrating an example mesh update management system 200, according to some embodiments. The mesh network management system 200 include a mesh network update manager 115 coupled with a mesh network 220. The mesh network 220 may be the same or similar to mesh network 120 described with respect to FIG. 1. The mesh network 220 may include one or more computing nodes 225 that are network capable and can communicate directly with the mesh network update manager 115. The mesh network 220 may further include one or more no network nodes 230 that can communicate with other nodes (e.g., computing nodes 225) of the mesh network 220 through peer to peer communication protocols (e.g., IR, RFID, etc.).

The mesh network update manager 115 may be the same or similar to the mesh network update manager 115 described with respect to FIG. 1. The mesh network update manager 115 may include rules 205 and mesh list 210. The rules 205 may include rules for how updates are provided to nodes of the mesh network 220. The mesh list 210 may include each of the computing nodes 225 and no network nodes 230 and their corresponding communication capabilities, the current software and/or firmware versions on each node, and whether each node has received updates. Using the rules 205 and mesh list 210, the mesh network update manager 115 may determine if the nodes 225 and 230 are up to date with the latest version of software and/or firmware and determine a strategy for providing updates to the nodes 225 and 230.

In some examples, upon determining that an update is available for one or more nodes of the mesh network 220, the mesh network update manager 115 may first notify the nodes that the update is available and provide the location of the update from which the node can retrieve the update. For example, the location may be a website, a neighbor node, a file transfer protocol (FTP) server, or other storage location from which a node can request and download the update. In some examples, if a node has been previously notified of the update, the mesh network update manager 115 may increment a counter (e.g., a number of attempts to notify the node). If the node has been notified a threshold number of times of the update but has not successful obtained the update, the mesh network update manager 115 may attempt to force push the update to the node. For example, the mesh network update manager may perform a pseudo-root login and perform the update directly for the node. If, however, the attempt to force push the update directly to the target node or if a force push is not possible (e.g., if the node is a no network node 230) then the mesh network update manager 115 may push instructions to a neighbor node (e.g., one of computing nodes 225 near the no network node 230) to force a peer to peer transfer of the update to the target node in a similar manner as the direct force push.

Furthermore, if all attempts to provide the update to the target node fail then the mesh network update manager 115 may remove the unavailable node 235 from the mesh network 220. For example, the mesh network update manager 115 may provide instructions to each of the computing nodes 225 and 230 of the mesh network 220 to remove the unavailable node 235 from routing tables and neighbor lists of the computing nodes 225 and 230. Accordingly, the remaining computing nodes 225 and 230 will no longer communicate with the unavailable node 235. The unavailable node 235 may then be replaced by another node to perform the functionality previously performed by the unavailable node 235.

Figure 3:
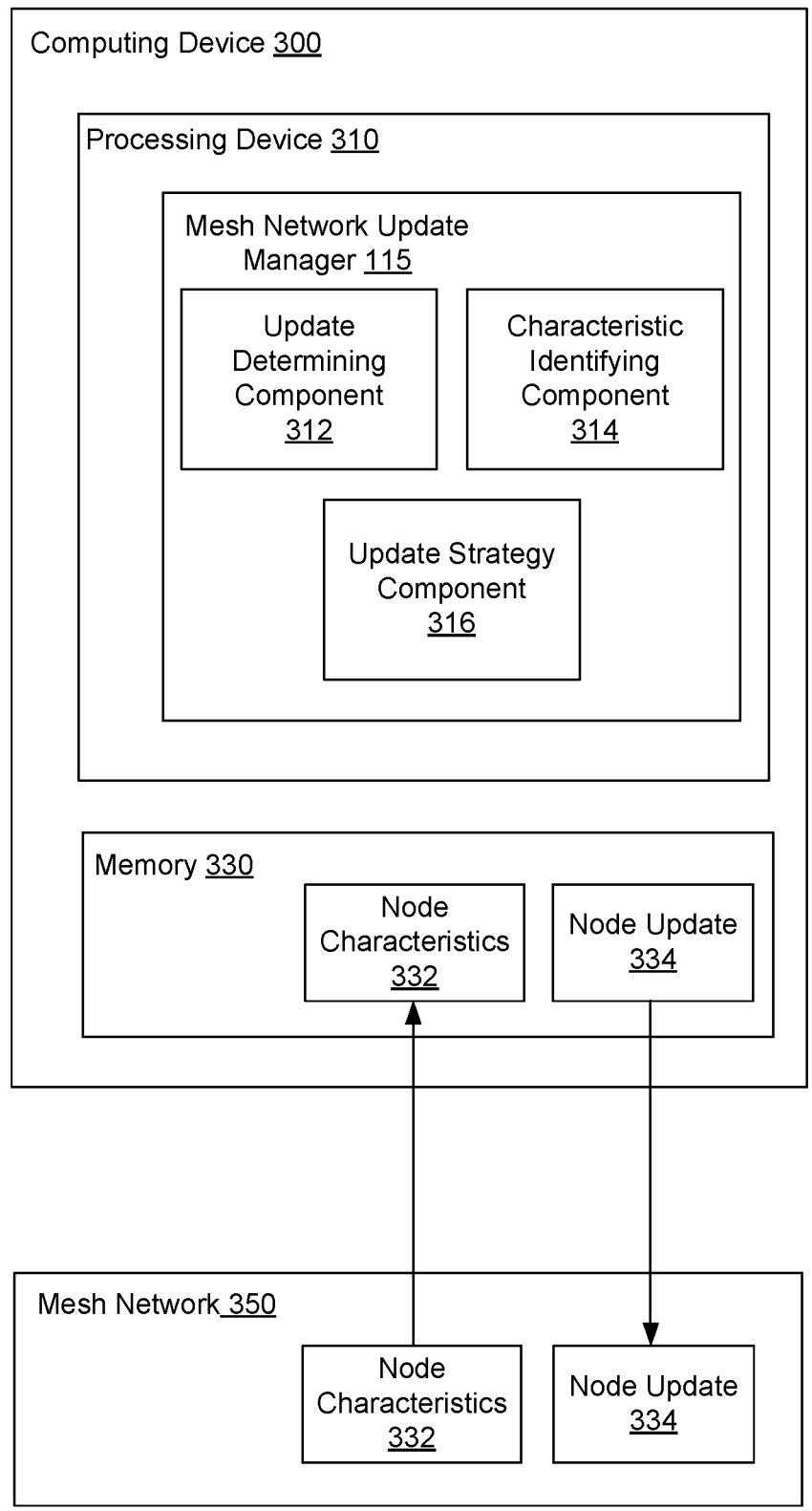
FIG. 3 depicts a component diagram that illustrates a computing system for mesh network update management, in accordance with one or more aspects of the present disclosure.

FIG. 3 is a block diagram that illustrates a computing system 300 for download optimization in a mesh network, according to some embodiments. Computing system 300 may include a processing device 310 and memory 330. Memory 330 may include volatile memory devices (e.g., random access memory (RAM)), non-volatile memory devices (e.g., flash memory) and/or other types of memory devices. Processing device 310 may be a central processing unit (CPU) or other processing device of computing system 300. Computing device 300 may be coupled to a mesh network 350. The mesh network 350 may include several computing nodes in communication with one another.

In one example, the processing device 310 may execute a mesh network update manager 115. The mesh network update manager 115 may include an update determining component 312, a characteristic identifying component 314, and an update strategy component 316. The update determining component 312 may determine that an update is available for at least one node in the mesh network 350. In some examples, the update determining component 312 may use node characteristics 332 (e.g., software and firmware versions, network capabilities, etc.) of each node to determine for which nodes an update is available. The characteristics identifying component 314 may identify the retrieved node characteristics 332. In some examples, the characteristics identifying component 314 may retrieve the node characteristics 332 from each node in the mesh network 350. The update strategy component 316 may determine an update strategy to be used to update nodes of the mesh network 350 based on the characteristics 332 of each of the nodes in the mesh network 350. For example, the update strategy component 316 may determine which available strategies have already been attempted, which strategies to prioritize, and whether the node should be removed from the mesh network 350. The update strategy component 316 may further push a node update 334 to one or more nodes of the mesh network 350 using the determined update strategy.

Figure 4:
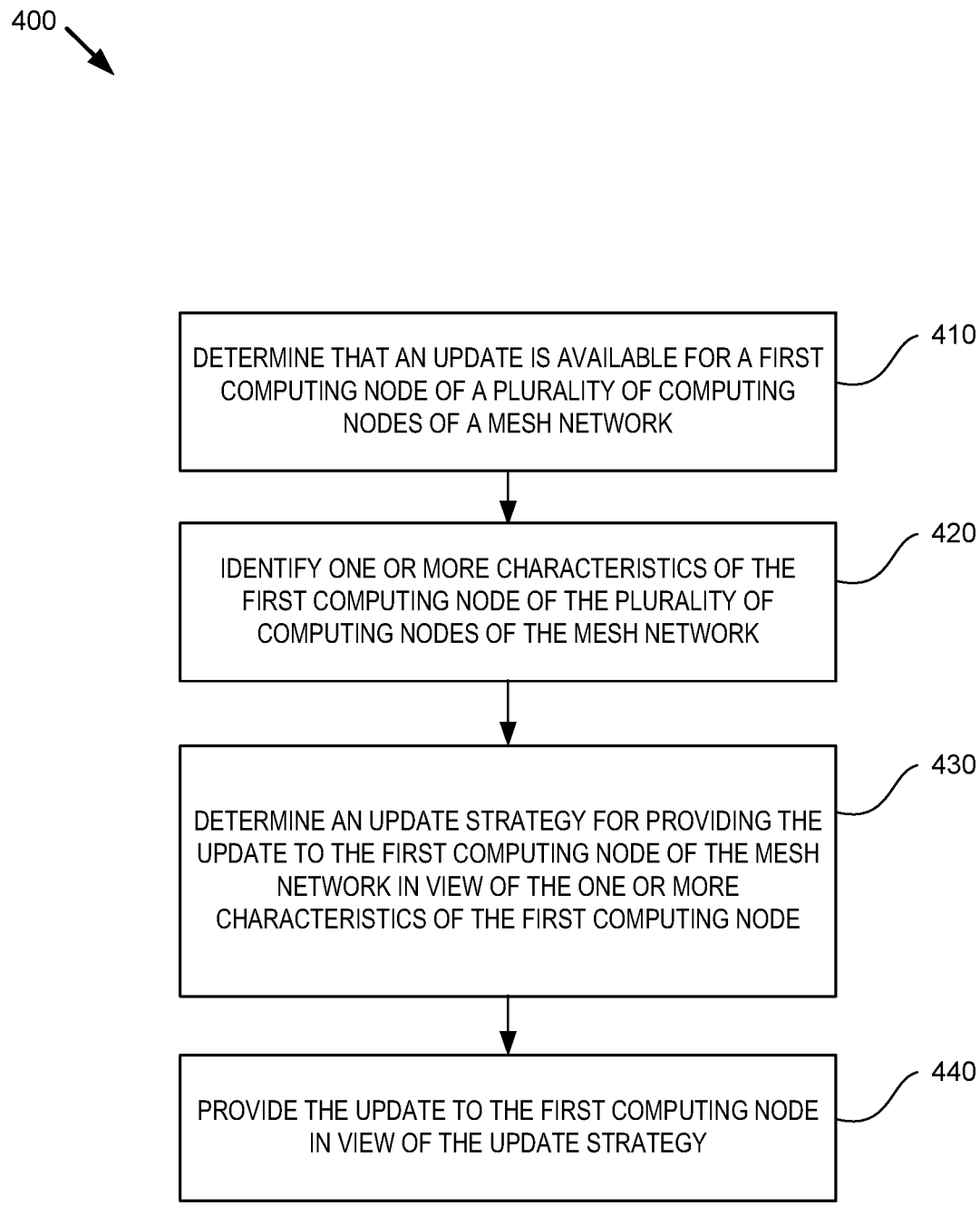
FIG. 4 is a flow diagram of a method of managing updates of a computing node in a mesh network, in accordance with one or more aspects of the disclosure.

FIG. 4 is a flow diagram of a method 400 of managing updates for nodes of a mesh network, in accordance with one or more aspects of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by mesh network update manager 115 of at least FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where processing logic determines that an update is available for a first computing node of a plurality of computing nodes of a mesh network. For example, the processing logic may compare a software version on the first computing node to the latest software version that is available for the service or software stack that is being executed by the first computing node.

At block 420, the processing logic identifies one or more characteristics of the first computing node of the plurality of computing nodes of the mesh network. In some examples, the one or more characteristics of the first computing node include at least communication capabilities of the first computing node. The one or more characteristics may further include previous attempts to update the first computing node.

Figure 5:
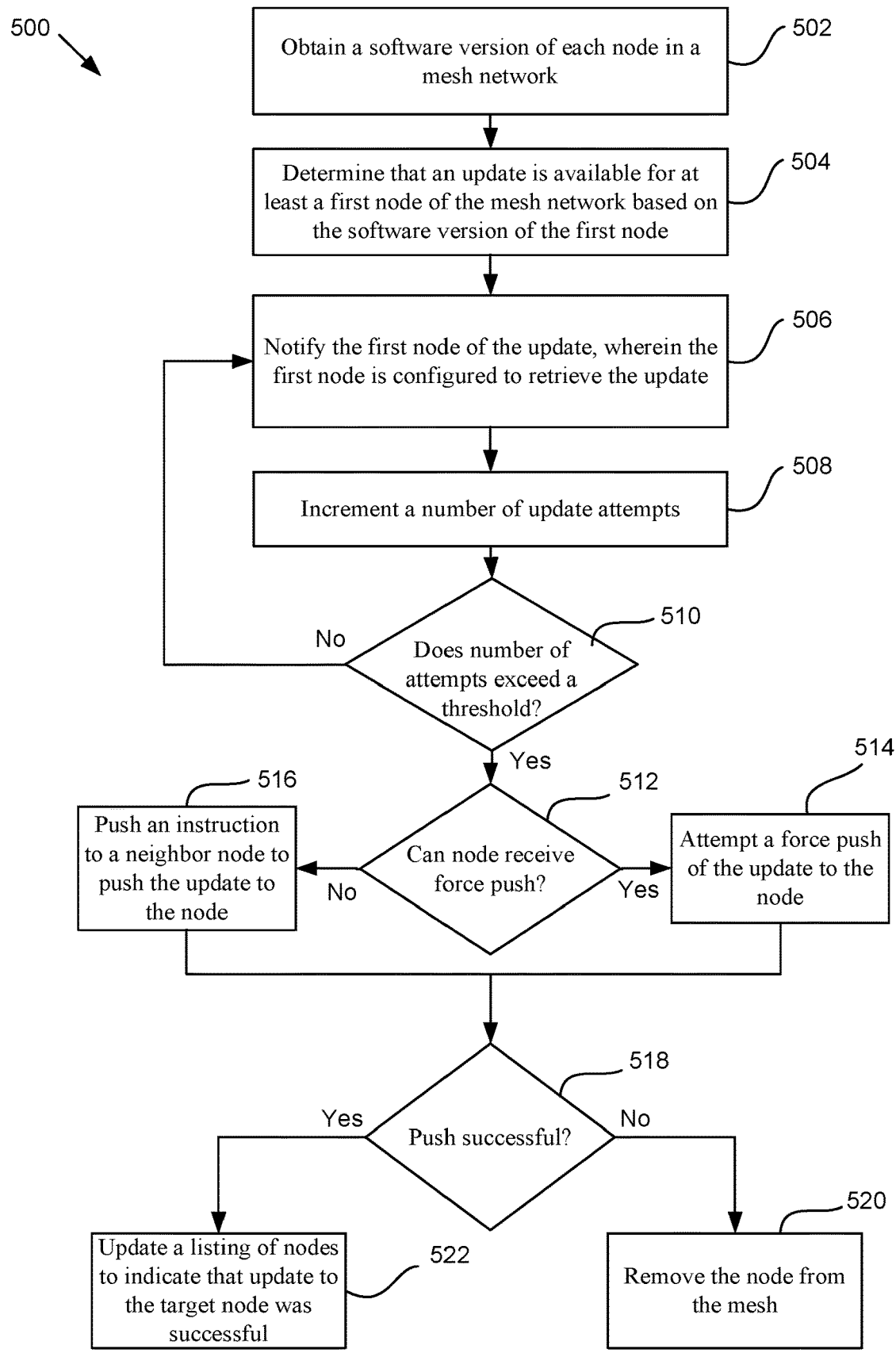
FIG. 5 is a flow diagram of a method of managing updates to nodes of a mesh network, in accordance with one or more aspects of the disclosure.

At block 430, the processing logic determines an update strategy for providing the update to the first computing node of the mesh network in view of the one or more characteristics of the first computing node. The processing logic may determine whether the notify the first computing node of the update and to allow the computing node to retrieve the update. The processing logic may further select a push method for force pushing the update to the first computing node. For example, the processing logic may directly push the update to the first computing node or provide instructions to a second computing node of the mesh (e.g., a neighbor node) to provide the update (e.g., if the first computing node is not capable of a network connection but is capable of peer to peer transfers). In one example, the processing logic may determine whether the first computing node has been notified of the update a threshold number of times before pushing the update directly to the first computing node. For example, each time the first computing node is notified, the processing logic may increment a counter and determine whether the counter exceeds a threshold number of update attempts. At block 440, the processing logic provides the update to the first computing node in view of the update strategy FIG. 5 is a flow diagram of a method 500 of managing updates for nodes of a mesh network, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by mesh network update manager 115 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 502, the processing logic obtains software version and firmware version of each node in a mesh network. The processing logic may obtain a metrics view of the entire mesh including capabilities (e.g., computing capabilities, network capabilities, peer to peer communication protocols, etc.) of each node along the software version numbers and neighbor nodes of each node in the mesh.

At block 504, the processing logic determines that an update is available for at least a first node of the mesh network based on the software version of the first node. For example, the processing logic may compare the version of the software on each node with the latest software available for the services executed by the node.

At block 506, the processing logic notifies the first node of the update, wherein the first node is configured to retrieve the update. The processing logic may provide the location of the update to the node where the node can then retrieve (e.g., download) the update. However, in some examples, the node may be unable to retrieve the update (e.g., if the node does not have the networking capacity to retrieve the update). At block 508, the processing logic increments a number of update attempts. For examples, the processing logic may increment a counter indicating the number of times the processing logic has notified the node of the update. At block 510, the processing logic determines if a number of update attempts exceeds a threshold number.

At block 512, in response to determining that the number of update attempts exceeds a threshold, the processing logic determines if the node is capable of receiving a force push. For example, the processing logic determines if the node is connected to a network via WiFi™, Ethernet, or other network protocol. At block 514, if the node can receive a force push, the processing logic attempts a force push of the update to the node. In some examples, the processing logic may take administrative control of the node to force the download and install of the update.

At block 516, if the node is not capable of receiving the force push, the processing logic pushes an instruction to a neighbor node to push the update to the target node. The processing logic may identify a neighbor node of the target node (e.g., a node capable of communicating with the target node via a peer to peer communication protocol.) The neighbor node may have previously received the update and the instructions may cause the neighbor node to provide the update to the target node in a peer to peer manner.

At block 518, the processing logic determines if the force push of the update was successful. For example, if the update is successful, the target node may provide an acknowledgment to the mesh network update manager of the successful update. In some examples, the target node may provide the acknowledgment directly. In other embodiments, the target node may provide the acknowledgement via a neighbor node.

At block 520, in response to the force push attempts failing, the processing logic removes the target node from the mesh. After determining that all the update attempts have failed, the processing logic may determine that the target node is unavailable. The processing logic may instruct each node in the network to stop communicating with the target node. For example, each node may remove the target node from routing tables, neighbor lists, etc. At block 522, the processing logic updates a listing of the node to indicate that the update to the target node was successful. Accordingly, the processing logic may track whether each node in the mesh network has been successfully updated and contains the most recent available software.

Figure 6:
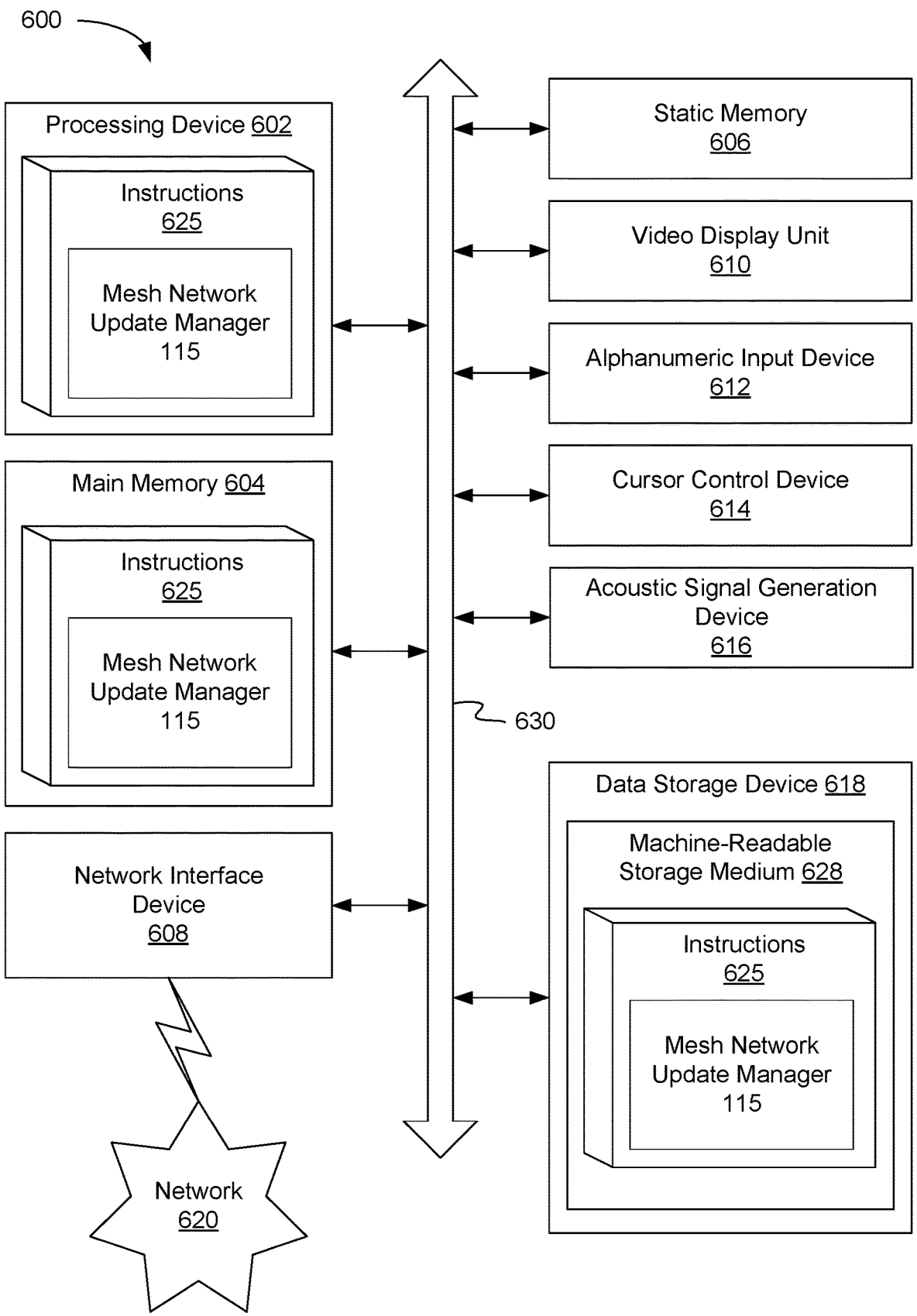
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a mesh network update manager, e.g., mesh network update manager 115 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "transmitting," "performing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware--for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    retrieving information from each computing node of a plurality of computing nodes of a mesh network, wherein the information comprises capabilities of each computing node and a software version of each computing node, wherein retrieving the information from each computing node comprises:
        obtaining the information directly from at least one computing node of the plurality of computing nodes; and
        obtaining the information through a peer node for computing nodes without network access;
    determining, based on the software version, that an update is available for a first computing node of the plurality of computing nodes of the mesh network;
    identifying, based on the capabilities of the first computing node, communication capabilities of the first computing node of the plurality of computing nodes of the mesh network, wherein identifying communication capabilities comprises determining whether the first computing node is network capable and whether the first computing node includes peer to peer communication protocols;
    determining, by a processing device, an update strategy for providing the update to the first computing node in view of the communication capabilities of the first computing node; and
    providing, by the processing device, the update to the first computing node in view of the update strategy, wherein the update strategy comprises:
        providing a link to the update to the first computing node;
        in response to determining that the first computing node fails to update using the link, pushing the update to the first computing node; and
        in response to determining that the push of the update to the first computing node has failed, providing instructions to a neighboring node of the first computing node to provide the update to the first computing node.

2. The method of claim 1, wherein the update strategy comprises:
    notifying the first computing node of the mesh network that the update is available;
    determining whether the first computing node has been notified of the update a threshold number of times; and
    in response to determining that the first computing node has been notified of the update the threshold number of times, pushing the update directly to the first computing node.

3. The method of claim 2, wherein determining whether the first computing node has been notified of the update the threshold number of times comprises:
    incrementing a counter indicating a number of times the first computing node has been notified of the update; and
    determining whether the counter exceeds the threshold number of times.

4. The method of claim 1, further comprising:
    selecting a push method to push the update to the first computing node in view of the communication capabilities.

5. The method of claim 1, wherein the update strategy comprises:
    pushing the update to the first computing node from a second computing node of the mesh network that previously received the update.

6. The method of claim 5, further comprising:
    in response to determining that the update to the first computing node has failed, determining that the first computing node is unavailable for the update; and
    isolating the first computing node from the mesh network.

7. A system comprising:
    a memory; and
    a processing device, operatively coupled to the memory, to:
        retrieve information from each computing node of a plurality of computing nodes of a mesh network, wherein the information comprises capabilities of each computing node and a software version of each computing node, wherein to retrieve the information from each computing node the processing device is to:
            obtain the information directly from at least one computing node of the plurality of computing nodes; and
            obtain the information through a peer node for computing nodes without network access;
        determine, based on the software version, that an update is available for a first computing node of the plurality of computing nodes of the mesh network;
        identify, based on the capabilities of the first computing node, communication capabilities of the first computing node of the plurality of computing nodes of the mesh network, wherein to identify communication capabilities the processing device is to determine whether the first computing node is network capable and whether the first computing node includes peer to peer communication protocols;
        determine an update strategy for providing the update to the first computing node in view of the communication capabilities of the first computing node; and provide the update to the first computing node in view of the update strategy, wherein the update strategy is to cause the processing device to:
provide a link to the update to the first computing node;
in response to determining that the first computing node fails to update using the link, push the update to the first computing node; and
in response to determining that the push of the update to the first computing node has failed, provide instructions to a neighboring node of the first computing node to provide the update to the first computing node.

8. The system of claim 7, wherein to provide the update, the processing device is to:
notify the first computing node of the mesh network that the update is available;
determine whether the first computing node has been notified of the update a threshold number of times; and
in response to determining that the first computing node has been notified of the update the threshold number of times, push the update directly to the first computing node.

9. The system of claim 8, wherein to determine whether the first computing node has been notified of the update the threshold number of times, the processing device is to:
increment a counter indicating a number of times the first computing node has been notified of the update; and
determine whether the counter exceeds the threshold number of times.

10. The system of claim 7, wherein the processing device is further to:
select a push method to push the update to the first computing node in view of the communication capabilities.

11. The system of claim 7, wherein to provide the update, the processing device is to:
push the update to the first computing node from a second computing node of the mesh network that previously received the update.

12. The system of claim 11, wherein the processing device is further to:
in response to determining that the update to the first computing node has failed, determine that the first computing node is unavailable for the update; and
isolate the first computing node from the mesh network.

13. A non-transitory computer-readable storage medium including instructions that, when executed by a processing device, cause the processing device to:
retrieve information from each computing node of a plurality of computing nodes of a mesh network, wherein the information comprises capabilities of each computing node and a software version of each computing node, wherein to retrieve the information from each computing node the processing device is to:
obtain the information directly from at least one computing node of the plurality of computing nodes; and
obtain the information through a peer node for computing nodes without network access;
determine, based on the software version, that an update is available for a first computing node of the plurality of computing nodes of the mesh network;
identify, based on the capabilities of the first computing node, communication capabilities of the first computing node of the plurality of computing nodes of the mesh network, wherein to identify communication capabilities the processing device is to determine whether the first computing node is network capable and whether the first computing node includes peer to peer communication protocols;
determine an update strategy for providing the update to the first computing node in view of the communication capabilities of the first computing node; and
provide the update to the first computing node in view of the update strategy, wherein the update strategy is to cause the processing device to:
provide a link to the update to the first computing node;
in response to determining that the first computing node fails to update using the link, push the update to the first computing node; and
in response to determining that the push of the update to the first computing node has failed, provide instructions to a neighboring node of the first computing node to provide the update to the first computing node.

14. The non-transitory computer-readable storage medium of claim 13, wherein to provide the update, the processing device is to:
notify the first computing node of the mesh network that the update is available;
determining whether the first computing node has been notified of the update a threshold number of times; and
in response to determining that the first computing node has been notified of the update the threshold number of times, push the update directly to the first computing node.

15. The non-transitory computer-readable storage medium of claim 14, wherein to determine whether the first computing node has been notified of the update the threshold number of times, the processing device is to:
increment a counter indicating a number of times the first computing node has been notified of the update; and
determine whether the counter exceeds the threshold number of times.

16. The non-transitory computer-readable storage medium of claim 13, wherein the processing device is further to:
select a push method to push the update to the first computing node in view of the communication capabilities.

17. The non-transitory computer-readable storage medium of claim 16, wherein to provide the update, the processing device is to:
push the update to the first computing node from a second computing node of the mesh network that previously received the update.

* * * * *